United States Patent [19]
Pudsey

[11] 3,919,708
[45] Nov. 11, 1975

[54] RANGING SYSTEMS

[75] Inventor: David Graham Pudsey, Essex, England

[73] Assignee: Elliott Brothers (London) Limited, London, England

[22] Filed: Mar. 18, 1974

[21] Appl. No.: 452,211

[30] Foreign Application Priority Data
Mar. 22, 1973 United Kingdom............... 13765/73

[52] U.S. Cl............................... 343/6.5 R; 343/17.7
[51] Int. Cl.²........................ G01S 9/56; G01S 7/40
[58] Field of Search........................ 343/6.5 R, 17.7

[56] References Cited
UNITED STATES PATENTS
3,513,470   5/1970   Rabow........................ 343/17.7 X
3,780,370   12/1973   Reeves........................ 343/6.5 R X

*Primary Examiner*—T. H. Tubbesing
*Attorney, Agent, or Firm*—Baldwin, Wight & Brown

[57] ABSTRACT

A two-way ranging system in which a first station transmits a signal and decodes this transmission to provide a first measured time, a second station receives the transmission, decodes the signals and records the decoded time as a second measured time, retransmits a signal to the first station, decodes the retransmission as a third measured time, the first station receiving the retransmitted signals, and decoding them to provide a fourth measured time. The interval between first and fourth times provides a range indication and spurious delays are compensated for by arranging that the interval between the second and third times is a fixed predetermined time.

4 Claims, 3 Drawing Figures

FIG. I.

RANGING SYSTEMS

This invention relates to ranging systems and more specifically to so-called two-way ranging systems. Whilst particularly applicable to aircraft the invention may also be applied to other two-way ranging systems in which ranging information concerning the distance separating two relatively mobile stations co-operating in the system is made available.

In a typical two-way ranging system for supplying ranging information concerning the distance separating an aircraft from a ground station, the aircraft transmits an interrogating signal to the ground station. A predetermined time after receipt of this interrogating signal the ground transmitter transmits a response signal to the aircraft. The time which elapses between transmission by the aircraft and receipt by the aircraft of the response from the ground station is an indication of the range of the aircraft from the ground station. A plurality of ground stations may cooperate in the system, in which case the transmissions from the aircraft are coded — normally by differences in the spacing of two relatively closely adjacent pulses — in dependence upon which of these ground stations is of interest to the aircraft. The aircraft determines if a response received from a ground station is intended for itself by utilising one of a number of available techniques. For example the aircraft may jitter its interrogating transmissions and seek synchronous responses.

In order to measure the time elapsed between the transmission by the aircraft and the reception of a response from the ground station, the airborne equipment decodes its own transmission and records the time of doing so as the start of a time period which ends with the time of decoding a response from the ground station.

This time period will, of course, not equal the actual transmission time since various delays are inherent in the decoding circuits in the airborne apparatus and in the decoding and triggering circuits of the apparatus at the ground station. Where these delays are fixed these may, of course, be allowed for in the computation of range. Such systems are, however, subject to other delays which are not predetermined. These are delays which, for example, are temperature dependent or which change with the aging of components or those which depend upon the variations in rise time, that is to say, variation in the time taken in any given piece of apparatus for a pulse to attain an amplitude which is selected for timing purposes.

The present invention seeks to provide an improved two-way ranging system in which the effects of variable delays are reduced.

According to this invention a two-way ranging system for providing an indication of the range between two stations comprises means at one station for transmitting an interrogating signal to the other, means at said one station for decoding its own transmission and recording the time of doing so as a first point in time, means at the other station for receiving said interrogating signal, decoding the same and recording the time of doing so as a second point in time, transmitting a response to said one station decoding its own transmission to said one station and recording the time of doing so as a third point in time, means at said one station for receiving said response signal, decoding the same and recording the time of doing so as a fourth point in time, whereby the period separating said first and fourth points in time is indicative of the distance separating said two stations and wherein, at said other station, means are provided for adjusting the time of its transmission of a response signal to said one station in order to make the time period between said second and said third points in time equal to a predetermined fixed period of time.

Preferably said one station is an airborne equipment carried by an aircraft and said other station is a ground station.

The invention is further described with reference to the accompanying drawings in which.

Figure 1:
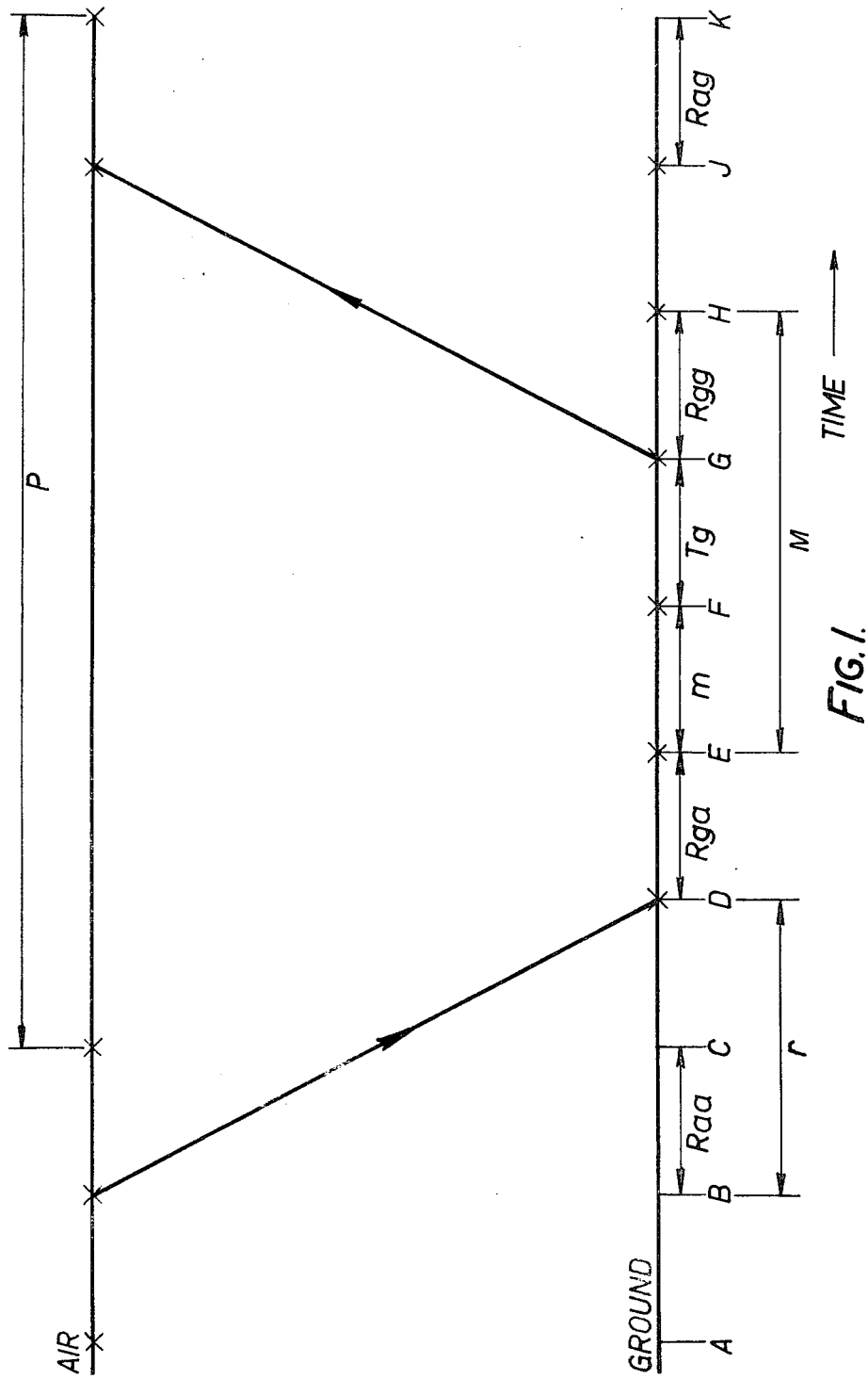
FIG. 1 is a timing diagram showing the sequence of events in a two-way ranging system in accordance with the present invention.

Referring to FIG. 1, the sequence of events in the system is as follows:

At time A, the airborne interrogating transmitter is triggered. In a so-called random access two-way ranging system this may occur at any time. In a so-called time-ordered two-way ranging system the aircraft is allocated a predetermined time in which to transmit interrogating signals.

At time B, the leading edge of the first pulse transmitted by the airborne interrogating transmitter (as with known systems, two closely spaced pulses will normally be transmitted, the spacing of each identifies the ground station from which ranging information is to be obtained), leaves the aircraft aerial.

At time C, the airborne interrogator receiver decodes its own transmitter sample as if it were a received response and records the time of doing so as first point in time which is the start of a time period which is to be used in calculating the range of the aircraft from the ground station.

At time D, the leading edge of the first pulse transmitted by the aircraft transmitter arrives at the ground station aerial.

At time E, the ground station transponder receiver decodes the received signal and records the time of doing so as a second point in time.

At time F, the ground station transponder transmitter is triggered to send a response back to the airborne equipment.

At time G, the leading edge of the first pulse (again two pulses are normally transmitted in order to identify the ground station transmitting) leaves the ground station aerial.

At time H, the ground station receiver decodes its own transmitter sample and records the time of doing so as a third point in time, the end of a time period which commenced at said second point in time (time E).

At time J, the leading edge of the first of the two response pulses transmitted by the ground station arrive at the airborne interrogator aerial.

At time K, the airborne interrogator decodes the received response pulses and records the time of doing so as a fourth point in time, the end of a time period which commenced at said first point in time (time C) when the interrogator receiver decoded its own transmitter sample. This time period is related to the range of the aircraft from the ground station.

From the above sequence of events it will be seen that $P = -Raa + r + Rga + m + Tg + r + Rag$, where:

P is the time period between time C when the airborne receiver decoded its own transmitter sample and the time K when the airborne interrogator receiver decoded the response received from the ground, Raa is the time period between the time B when the leading edge of the first pulse transmitted by the airborne transmitter left the airborne aerial and the time C when the airborne interrogator receiver decoded its own transmitter sample, $r$ is the period between time B when the leading edge of the first pulse left the airborne aerial and the time D when the leading edge of the first pulse arrived at the ground station aerial (i.e. the time of transmission from the aircraft to the ground station which is range dependent), Rga is the period between time D when the leading edge of the first pulse transmitted by the airborne transmitter arrives at the ground station aerial and the time E when the ground station transponder receiver decoded the received signal, $m$ is the time period between the time E when the ground station transponder receiver decoded the received signal and the time F when the ground station transponder transmitter is triggered, Tg is the period between the time F when the ground station transponder transmitter is triggered and the time G at which the leading edge of the first pulse leaves the ground station transmitter aerial and, Rag is the time period between the time J when the leading edge of the first of the two response pulses arrives at the airborne interrogator aerial and the time K when the airborne interrogator decodes the response received from the ground station.

In accordance with the present invention the period of time from the second point in time E, when the ground station transponder receiver decoded the interrogating signal from the aircraft to the third point in time H, when the ground station transponder receiver decoded its own transmitter sample, is made equal to a predetermined fixed period of time M or, in other words, the sequence of events from the second point in time E to the third point in time H is adjusted to make $m + Tg + Rgg = M$, where Rgg equals the period between the time G, when the leading edge of the first response leaves the ground station aerial and the time H when the ground station transponder receiver decodes its own transmitter sample.

This is effected by measuring the period $Tg + Rgg$ on previous transmissions and making $m = M - (Tg + Rgg)$ then $p = -Raa + 2r + Rga + M - Rgg + Rag = 2r + M + Rag - Raa + Rga - Rgg$ where $2r$ is the required measurement (i.e. twice the time of propagation between the aircraft and the ground station).

$Rag - Raa + Rga - Rgg$ may be regarded as error due to receiver delays. In principal these delays may be of three different kinds.

A. Fixed delays

B. Delays which may vary with temperature or aging and

C. Delays which depend upon rise time

With the timing of the sequence of events arranged as described above fixed delays at the airborne and ground stations are cancelled as there is a corresponding term of each sign associated with each equipment.

Slowly varying delays due to temperature or ageing variations also cancel for the same reason.

The delay due to the airborne and ground station receivers depends upon the band width of the I.F. amplifiers and other signal processing circuits and because, in each case, the pulse is timed when the amplitude of its leading edge is a fixed proportion of the peak level of the rise time:

a. If the airborne and ground transmitters have equal rise time, then $Raa = Rag$ and $Rga = Rgg$ giving no error, and b. If the two receivers have equal band width then similarly $Raa = Rga$ and $Rag = Rgg$ again giving no error.

In practice it is difficult to control rise time, but band width may be controlled accurately and indeed is normally controlled accurately for other reasons, e.g. to reduce adjacent channel interference.

Thus it will be seen that by arranging the timing of the sequence of events in accordance with the present invention and provided the band widths of the receivers in both the airborne and ground station are closely controlled, errors due to delay variations can be cancelled to a first order.

Figure 2:
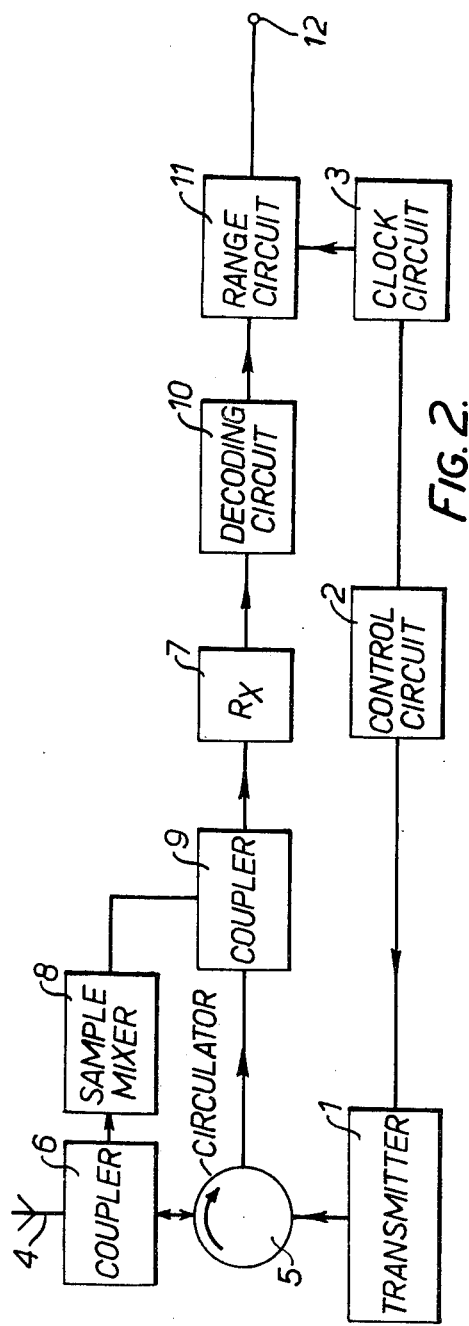
FIGS. 2 and 3 are simplified schematic block diagrams of a typical airborne equipment and a ground station equipment co-operating in the system.

Referring to FIG. 2, the airborne equipment consists of a transmitter 1, which is triggered by a control circuit 2 under the control of a clock circuit 3 to transmit a pair of interrogating pulses to a selected ground station. The spacing of this pair of pulses is controlled by control circuit 2 in dependence upon the ground station of interest.

Transmitter 1 is connected to an aerial 4 via a circulator 5 and a coupler 6. Circulator 5 is provided in a manner known per se to enable a receiver 7 to receive via the same aerial 4. Coupler 6 couples out a sample of the interrogating signal transmitted by transmitter 1, which sample is fed to the receiver 7 via a sample mixer 8 and a further coupler 9, so that it appears to the receiver as if it were a received response from a ground station.

The output from receiver 7 is connected to a decoding circuit 10 where both the interrogating signal transmitted by transmitter 1 and any response signal transmitted by the ground station to which the interrogating signal is addressed are decoded. Decoded signals from decoding circuit 10 are applied to a range computing circuit 11 which computes the range of the aircraft from the particular ground station by comparing the time at which the aircraft's own transmission was decoded with the time at which a received response was decoded. Range computing circuit 11 applies range output signals to a utilisation terminal 12 and may be as well known per se.

Figure 3:
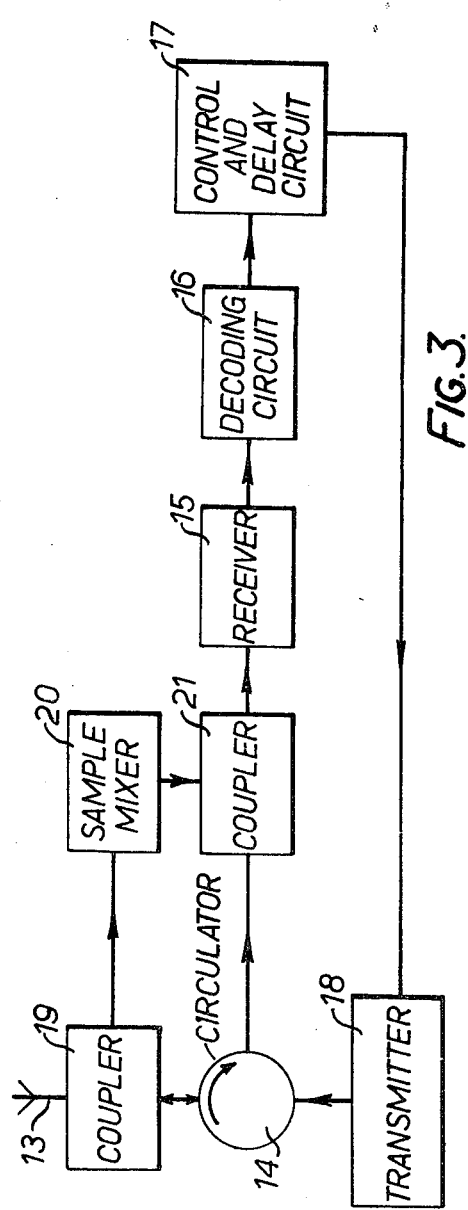

Referring to FIG. 3, which consists of an aerial 13 by means of which interrogating signals from an aircraft are received. Such received interrogating signals are passed via a circulator 14 to a receiver 15. Output from receiver 15 is applied to a decoding circuit 16, which is arranged to recognise interrogating signals intended for the particular ground station, as identified by the spacing of a pair of pulses forming the interrogating signal. Output from decoding circuit 16 is applied to a control and delay circuit 17, which is connected to trigger a transmitter 18. Transmitter 18 is connected via circulator 14 to aerial 13 and upon triggering by control and delay circuit 17, it transmits a response signal, again consisting of two pulses whose spacing identifies the ground station in question, to the interrogating aircraft.

Between circulator 14 and aerial 13 is connected a coupler 19, which samples the response signal transmitted by transmitter 18 and passes this via a sample mixer circuit 20 and a further coupler 21 to the input of receiver 15. The sample of the ground stations own transmitted response signal is decoded by decoding circuit 16 and applied to the control and delay circuit 17. Control and delay circuit 17 is arranged to adjust the time of triggering transmitter 18 in such manner that the time period between the decoding by decoding circuit 16 of an interrogating signal received from an aircraft and intended for the particular ground station and the decoding by decoding circuit 16 of the sample of the ground stations own transmission is equal to a predetermined constant period of time, as already explained with reference to FIG. 1. The value of this predetermined constant period of time may be chosen to suit the particular ranging system in hand. In a typical example, however, where the aircraft has a time period of 1,000 micro-seconds in which to interrogate a ground station and receive a response therefrom, this predetermined constant period of time if 50 micro-seconds.

I claim:

1. A two-way ranging system for providing an indication of the range between two stations by determining the time period between the time at which one of the stations transmits an interrogating pulsed signal to the other and the time at which said one station receives a response pulsed signal from the other, said one station including transmitter means for transmitting an interrogating pulsed signal, said other station including a receiver which includes a transmission frequency input circuit, means for transmitting a response pulsed signal, means for sampling said response pulsed signal to produce a test signal, means for applying said test signal to said transmission frequency input circuit, means connected to said receiver for decoding at a first time said interrogating pulsed signals received from said one station and for decoding at a second time said test signal, and means, connected to and controlled by said decoding means, and connected to said transmitting means for controlling the time at which the transmitting means is triggered to transmit said response pulsed signal to said one station so as to make the time period between said first time and said second time equal to a predetermined fixed period of time.

2. A system as claimed in claim 3 wherein said one station is an airborne equipment carried by an aircraft and said other station is a ground station.

3. A two-way ranging system comprising, in combination:

a first station including first aerial means for transmitting and receiving pulsed signals, a first transmitter connected to said aerial means, a first receiver having a single input connection to said aerial means for receiving pulsed signals transmitted at said first aerial means and for receiving pulsed signals received at said first aerial means, a control circuit connected to said first transmitter and adapted to trigger said first transmitter to transmit a coded pair of pulsed interrogation signals, each interrogation signal of said pair having a first rise time which is determined by said first transmitter, a clock circuit connected to said control circuit to initiate transmission of said pair of interrogation signals, a range computing circuit connected to said clock circuit and a first decoding circuit connecting said first receiver to said range computing circuit;

a second station including second aerial means for transmitting and receiving pulsed signals, a second transmitter connected to said second aerial means, a second receiver having a single input connection to said second aerial means for receiving pulsed signals transmitted at said second aerial means and for receiving pulsed signals received at said second aerial means, a second decoding circuit connected to the output of said second receiver, and control/delay circuit means connected between said second decoding circuit and said second transmitter for causing said second transmitter to transmit a coded pair of pulsed response signals in response to reception of said interrogation signals at said second aerial means, each response signal having a second rise time which is determined by said second transmitter and which may be different from said first rise time;

said first and second receivers having equal bandwidths whereby the delay in passing said interrogation signals through said first receiver is equal to the delay in passing said interrogation signals through said second receiver and the delay in passing said response signals through said second receiver is equal to the delay in passing said response signals through said first receiver; and said control/delay circuit means maintaining a fixed delay time between the time said second decoding circuit decodes said pulsed interrogation signals and the time said second decoding circuit decodes said pulsed response signals whereby variations of said delays and of said rise times are compensated to a first order.

4. A system as claimed in claim 3, wherein said first station is an airborne equipment carried by an aircraft and said second station is a ground station.

* * * * *